United States Patent [19]

Colon

[11] 4,400,499

[45] Aug. 23, 1983

[54] INTEGRATED PROCESS FOR THE PREPARATION OF SUBSTANTIALLY LINEAR HIGH MOLECULAR WEIGHT THERMOPLASTIC POLYMERS FROM ARYL POLYHALIDE MONOMERS

[75] Inventor: Ismael Colon, Middlesex, N.J.

[73] Assignee: Union Carbide Corporation, Danbury, Conn.

[21] Appl. No.: 335,521

[22] Filed: Dec. 29, 1981

[51] Int. Cl.$^3$ .................. C08G 65/40; C08G 75/23
[52] U.S. Cl. .................................. 528/174; 528/125; 528/126; 528/128; 528/172; 528/175; 528/210; 528/211; 528/212; 528/214; 528/215; 528/216; 528/217; 528/218; 528/219
[58] Field of Search ............... 528/125, 126, 128, 172, 528/174, 175, 210–218, 219

[56] References Cited

U.S. PATENT DOCUMENTS

| | | | |
|---|---|---|---|
| 4,105,635 | 8/1978 | Freeman | 528/174 |
| 4,105,636 | 8/1978 | Taylor | 528/174 |
| 4,108,837 | 8/1978 | Johnson et al. | 528/126 |
| 4,113,698 | 9/1978 | Staniland | 528/174 |
| 4,195,175 | 11/1979 | Johnson et al. | 528/125 |
| 4,263,466 | 4/1981 | Colon et al. | 585/421 |
| 4,275,186 | 6/1981 | Kawakami et al. | 528/174 |
| 4,307,222 | 12/1981 | Schwab et al. | 528/174 |

FOREIGN PATENT DOCUMENTS 52-154900 12/1977 Japan .

OTHER PUBLICATIONS

Michio Zembayashi et al., *Nickel–Phosphine Complex--Catalyzed Homo Coupling* . . . , Tetrahedran Letters No. 47, 4089–4092 (1977).
Takakazu Yamamoto et al., *A Novel Type of Polycondensation* . . . , Bull. Chem. Soc. Japan 51 (7), 2091–2097 (1978).

*Primary Examiner*—Lester L. Lee
*Attorney, Agent, or Firm*—Gerald L. Coon; Donald M. Papuga

[57] ABSTRACT

Described herein is an integrated process for the preparation of substantially linear high molecular weight thermoplastic polymers derived from aryl polyhalide monomers. Aryl polyhalide monomers are first prepared by the reaction of an alkali metal salt of a phenol compound, e.g., dipotassium salt of bisphenol A, with a dihalobenzenoid compound, e.g., 4,4'-dichlorophenylsulfone, in a liquid phase of an aprotic solvent and an azeotrope former, e.g., toluene. Water is removed from the reaction mass as an azeotrope until substantially anhydrous conditions are attained. The aryl polyhalide monomers are then coupled by contacting the monomers with a catalyst mixture of a nickel compound and a ligand in the presence of a reducing metal, e.g., zinc, and an aprotic solvent under substantially anhydrous conditions to form substantially linear high molecular weight thermoplastic polymers.

34 Claims, No Drawings

INTEGRATED PROCESS FOR THE PREPARATION OF SUBSTANTIALLY LINEAR HIGH MOLECULAR WEIGHT THERMOPLASTIC POLYMERS FROM ARYL POLYHALIDE MONOMERS

BRIEF SUMMARY OF THE INVENTION

Technical Field

This invention is directed to an integrated process for the preparation of substantially linear high molecular weight thermoplastic polymers derived from aryl polyhalide monomers. A phenol compound, e.g., bisphenol A or p-chlorophenol, is contacted with an alkali metal carbonate or hydroxide, e.g., potassium carbonate, to form an alkali metal salt of the phenol compound which is contacted with a dihalobenzenoid compound, e.g., 4,4'-dichlorophenylsulfone, sufficient to form an aryl polyhalide monomer in a liquid phase of an aprotic solvent, e.g., N,N-dimethylacetamide, and an azeotrope former, e.g., toluene. Water is removed from the reaction mass as an azeotrope with the azeotrope former until substantially anhydrous conditions are attained and any excess azeotrope former is substantially removed. The aryl polyhalide monomers are then coupled by contacting the monomers with a catalyst mixture of a nickel compound and a ligand in the presence of a reducing metal, e.g., zinc, and an aprotic solvent, e.g., N,N-dimethylacetamide, under substantially anhydrous conditions to form a substantially linear high molecular weight thermoplastic polymer.

BACKGROUND OF INVENTION

This invention relates to an integrated process for the preparation of substantially linear high molecular weight thermoplastic polymers derived from aryl polyhalide monomers. More particularly, the invention relates to the intermediate preparation of aryl polyhalide monomers in a liquid phase of an aprotic solvent and an azeotrope former wherein water is removed from the reaction mass as an azeotrope until substantially anhydrous conditions are attained. The aryl polyhalide monomers are then coupled through carbon-to-carbon bonding by contacting the monomers with a catalyst mixture of a nickel compound and a ligand in the presence of a reducing metal and an aprotic solvent under substantially anhydrous conditions to form a substantially linear high molecular weight themoplastic polymer.

Polymerization reactions which form carbon-to-carbon bonds are few although they are extremely useful in organic synthesis. Copending U.S. patent application Ser. No. 072,309, filed Sept. 11, 1979, describes the coupling of aryl and heteroaryl polyhalide monomers in an aprotic solvent under anhydrous conditions using a catalyst mixture of a nickel compound and a ligand in the presence of a reducing metal. This copending application describes the only presently known aryl-aryl coupling process which is capable of producing high molecular weight polymers. The present invention enhances the practicality of copending U.S. patent application Ser. No. 072,309 in terms of material handling and economics. The substantially linear high molecular weight thermoplastic polymers prepared in accordance with the integrated process of the present invention are relatively inexpensive and also relatively simple to prepare. These polymers exhibit excellent strength and toughness properties as well as outstanding thermal, oxidative and chemical stability. They find wide utility in the production of shaped and molded articles where such properties are necessary and are highly desirable and also in the preparation of film and fiber products which have excellent mechanical properties.

Heretofore, both the isolation and purification of aryl polyhalide monomers have been required before contacting the monomers with a catalyst mixture of a metal compound to form thermoplastic polymers as described in copending U.S. patent application Ser. No. 072,309. It has been demonstrated that in the instant polymerization reaction the solvent must be maintained substantially anhydrous before and during the reaction. While amounts of water up to about 0.01 percent can be tolerated, amounts of water substantially greater than this are desirably avoided as the reaction of water with the aryl polyhalide monomers in the presence of an active catalyst leads to reduction and only low molecular weight products are secured. It has been demonstrated in copending U.S. patent application Ser. No. 302,691, filed Sept. 15, 1981, now abandoned, that aryl halides can be efficiently reduced by water in the presence of a nickel catalyst as utilized in the instant invention. The reaction of water with the catalyst mixture also leads to the deactivation of the active catalyst. In order to secure the production of substantially linear high molecular weight thermoplastic polymers, the reaction system should be substantially anhydrous and preferably with less than 0.01 percent by weight water in the polymerization reaction mixture. Thus, it is desirable to provide an integrated process directed to the intermediate preparation of aryl polyhalide monomers with the simultaneous removal of substantially all water therefrom, thereby eliminating the need for further procedural steps, such as isolation and purification of the aryl polyhalide monomers and the resulting problems of handling and expense attributable to these steps, before the aryl polyhalide monomers can be directly contacted with a catalyst mixture in the presence of a reducing metal and an aprotic solvent under anhydrous conditions to form substantially linear high molecular weight thermoplastic polymers.

It is completely unexpected that an integrated process can be employed for the preparation of substantially linear high molecular weight thermoplastic polymers due to the known ease of reduction of aryl halides caused by trace amounts of water and the sensitivity, e.g., deactivation, of the catalyst mixture to water. According to the present invention, it has now been discovered that the addition of an azeotrope former, e.g., toluene, to an aprotic solvent effectively removes water from an aryl polyhalide monomer reaction mixture until sufficient anhydrous conditions are attained for directly contacting the aryl polyhalide monomers with a catalyst mixture in the presence of a reducing metal and an aprotic solvent under substantially anhydrous conditions to form substantially linear high molecular weight thermoplastic polymers by carbon-to-carbon bond polymerization. As a result of the present invention, there is no longer a need for isolation and purification of an aryl polyhalide monomer mixture before effectively employing the mixture in a carbon-to-carbon bond polymerization reaction. The additional problems of handling and expense attributable to the isolation and purification steps are also eliminated by the integrated process of this invention. Sufficient anhydrous conditions are attained in the integrated process of the instant invention so as to effectively prevent the reduction of the aryl polyhalide monomers, prevent the deactivation of the water-sensitive catalyst mixture and thus provide for the efficient preparation of substantially linear high molecular weight thermoplastic polymers.

U.S. Pat. No. 4,263,466 describes a method of coupling aryl and heteroaryl mono chlorides in an aprotic solvent under an inert atmosphere by employing a catalyst mixture of nickel compound and a ligand in the presence of a reducing metal to form coupled products, e.g., biphenyl compounds.

U.S. Pat. No. 4,175,175 and U.S. Pat. No. 4,108,837 describe high molecular weight polyarylene polyethers which are the linear thermoplastic reaction products of an alkali metal double salt of a dihydric phenol, e.g., dipotassium salt of 2,2-bis(4-hydroxyphenyl)propane, and a dihalobenzenoid compound, e.g., 4,4'-dichlorophenylsulfone. The polymers have a basic structure composed of recurring units having the formula

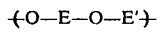

wherein E is the residuum of the dihydric phenol and E' is the residuum of the dihalobenzenoid compound, both of which are valently bonded to the ether oxygen through aromatic carbon atoms. The polymerization reaction is conducted in a liquid phase of a sulfoxide or sulfone organic solvent and an azeotrope former such as chlorobenzene, dichlorobenzene and xylene. Water is removed from the reaction as an azeotrope with the azeotrope former to avoid the reaction of water with the dihalobenzenoid compound which leads to the formation of phenolic species and only low molecular weight products are secured. It is stated that water amounts of 0.5 weight percent may be tolerated in the process of these two patents. This is in contrast to the instant invention in which it is critical that azeotropic removal provide sufficient dryness, i.e., 0.01 weight percent, to allow the formation of high molecular weight polymers.

Michio Zembayashi, Kohei Tamao, Jun-ichi Yoshida and Makoto Kumada, *Nickel-Phosphine Complex-Catalyzed Homo Coupling of Aryl Halides in the Presence of Zinc Powder*, Tetrahedron Letters No. 47, 4089–4092 (1977), printed in Great Britain, discloses the nickel-phosphine complex-catalyzed homo coupling of aryl halides in the presence of zinc powder. Specifically, Table I on page 4090 summarizes the results of homo coupling of bromobenzene to biphenyl under various conditions. Dimethylformamide is stated to be the most suitable solvent in the coupling reaction. The reaction is carried out in the presence of [Ni(PPh$_3$)$_2$Cl$_2$], triphenylphosphine and zinc powder at a temperature of 50° C. as described on page 4090. Table II on page 4091 describes the homo coupling of various organic bromide compounds to biphenyl. The reference additionally states on page 4091 that the addition of iodide ions to the reaction mixture greatly accelerates the coupling reaction.

Takakazu Yamamoto, Yasuhiro Hayashi and Akio Yamamoto, *A Novel Type of Polycondensation Utilizing Transition Metal-Catalyzed C-C Coupling. I. Preparation of Thermostable Polyphenylene Type Polymers*, Bulletin of the Chemical Society of Japan, Vol. 51 (7), 2091–2097 (1978) and Japanese Kokai Sho No. 52-154900/77 describes the polycondensation of di- and polyhalogenated organic compounds via magnesium Grignard reagents in the presence of of a transition metal catalyst to produce polyphenylene type polymers. The catalysts include di- and trivalent compounds such as NiCl$_2$ (2,2'-bipyridine), NiBr$_2$ (triphenylphosphine), PdCl$_2$ (2,2'-bipyridine), NiCl$_2$, CaCl$_2$, FeCl$_2$ and FeCl$_3$. The reaction is conducted in ether solvents such as tetrahydrofuran, dibutyl ether and diglyme. The work of Yamamoto et al. is a stated extension of well known prior art on the coupling of aromatic Grignard reagents with aryl halides.

However, none of these references disclose an integrated process for the preparation of substantially linear high molecular weight thermoplastic polymers derived from the carbon-to-carbon bond polymerization of aryl polyhalide monomers under substantially anhydrous conditions as disclosed in the instant invention.

DISCLOSURE OF INVENTION

The present invention provides an integrated process for preparing a substantially linear high molecular weight thermoplastic polymer derived from an aryl polyhalide monomer which comprises:

(i) contacting a phenol compound with about stoichiometric amounts of an alkali metal carbonate or hydroxide sufficient to form an alkali metal salt of the phenol compound in a liquid phase of an aprotic solvent and an azeotrope former and for a time and at a temperature sufficient to form the alkali metal salt of the phenol compound;

(ii) contacting the alkali metal salt of the phenol compound with a dihalobenzenoid compound sufficient to form an aryl polyhalide monomer in a liquid phase of an aprotic solvent and an azeotrope former and for a time and at a temperature sufficient to form the aryl polyhalide monomer, wherein the dihalobenzenoid compound has an inert electron withdrawing group in one or more of the positions ortho and para to the halogen atoms thereby activating the halogen atoms to a level sufficient to react with said alkali metal salt of the phenol compound;

(iii) removing water from the reaction mass of (i) and (ii) as an azeotrope with said azeotrope former until substantially anhydrous conditions are attained and excess azeotrope former is substantially removed; and (iv) coupling aryl polyhalide monomers by contacting said monomers with a catalyst mixture in the presence of a reducing metal selected from the group consisting of zinc, magnesium and manganese or mixtures thereof and in a liquid phase of an aprotic solvent under substantially anhydrous conditions for a time and at a temperature sufficient to form a substantially linear high molecular weight thermoplastic polymer, wherein the catalyst mixture comprises an anhydrous nickel compound and at least one ligand selected from the group consisting of a triarylphosphine having from about 6 to about 14 carbon atoms in each aryl moiety and an aromatic bidentate compound containing at least one ring nitrogen atom and from about 5 to about 30 carbon atoms and wherein the ratio of gram atoms of nickel per mole of aryl polyhalide monomer is from about 0.001 to about 0.1, the amount of ligand is from about 1 to about 50 moles per gram atom of nickel and the amount of reducing metal is at least about 1 mole or reducing metal per mole of aryl polyhalide monomer. The process of the instant invention is appropriately termed an integrated process to describe the uniting of the monomer reaction, i.e., the preparation of aryl polyhalide monomers, with the polymerization reaction, i.e., the preparation of high molecular weight polymers, under substantially anhydrous conditions, thereby eliminating previously required additional procedural step such as isolation and purification of the aryl polyhalide monomers and the resulting problems of handling and expense attributable to these steps.

The present invention also provides substantially linear high molecular weight thermoplastic polymers having recurring units of the general formula:

$$+E'-O-E-O-E'+$$

where E is the residuum of a dihydric phenol compound and E' is the residuum of a dihalobenzenoid compound and wherein the E residuum is valently bonded to ether oxygens through aromatic carbon atoms and the E' residua are valently bonded to each of an aromatic carbon atom and an ether oxygen through an aromatic carbon atom.

The present invention further provides substantially linear high molecular weight thermoplastic polymers having recurring units of the general formula:

$$+E'-O-E+$$

where E is the residuum of a phenol compound and E' is the residuum of a dihalobenzenoid compound and wherein the E residuum and E' residuum are valently bonded to each of an aromatic carbon atom and an ether oxygen through an aromatic carbon atom.

In another aspect of this invention, the catalyst mixture described in (iv) above and the alkali metal salt of a phenol compound described in (i) above can be formed in situ in the presence of the aryl polyhalide monomer solution described in (ii) above. The aryl polyhalide monomer solution can also be added to the catalyst mixture either continuously, incrementally or all at once so as to achieve the polymerization reaction. Thus the reaction can be readily conducted in batch, semi-continuous or continuous operation by the proper selection or adjustment of addition rate, reaction rate and temperature as is obvious to those skilled in the art from the present invention.

DETAILED DESCRIPTION

The integrated process of this invention proceeds in the liquid phase of an aprotic solvent at elevated temperatures as hereinafter more fully set forth. The preferred aprotic solvents include dipolar solvent, such as N,N-dimethylacetamide, N,N-dimethylformamide, dimethylsulfoxide, sulfolane and the like. If desired these aprotic solvents can be mixed with lower polarity inert solvents, such as saturated aliphatic hydrocarbons, including pentanes, hexanes, dodecanes, and the like; aromatic hydrocarbons, such as benzene, toluene, xylenes and the like; saturated aliphatic and cycloaliphatic ethers, such as diethyl ether, diglyme, tetrahydrofuran and the like. N,N-dimethylacetamide is the most preferred aprotic solvent and toluene is the most preferred lower polarity inert solvent for use in the integrated process of this invention. It should be noted that the same solvent can be employed in each procedural step of the integrated process of this invention, i.e., formation of the alkali metal salt of a phenol compound, formation of the aryl polyhalide monomers (monomer reaction) and formation of the substantially linear high molecular weight thermoplastic polymers (polymerization).

It is essential in the polymerization reaction that the solvent be maintained substantially anhydrous before and during the reaction. While amounts of water up to about 0.01 percent by weight can be tolerated, amounts of water substantially greater than this are desirably avoided as the reaction of water with the aryl polyhalide monomers in the presence of a nickel catalyst leads to reduction and only low molecular weight products are secured. The reaction of water with the catalyst mixture also leads to deactivation of the active catalyst. In order to secure the production of high molecular weight substantially linear thermoplastic polymers, the integrated system should be substantially anhydrous, and preferably with less than 0.01 percent by weight water in the reaction mixture. During the monomer reaction, i.e., (i) and (ii) above, the water content can be as high as 0.5 weight percent but the water content should preferably be reduced to at least about 0.01 weight percent before polymerization in the presence of a nickel catalyst can be effected, i.e., (iv) above.

While such problems are essentially avoided when using a dry crystalline alkali metal salt of the phenol compound, as the one reactant in the integrated process of this invention described above, it is often more convenient to form the alkali metal salt in situ in the aryl polyhalide monomer solution of the integrated process.

In situations where it is desired to prepare the alkali metal salt of the phenol compound in situ in the aryl polyhalide monomer solution at the integrated process, the phenol compound and an alkali metal carbonate or hydroxide are admixed in essentially stoichiometric amounts and normal precautions taken to remove all the water of neutralization preferably by distillation of a water-containing azeotrope from the aryl polyhalide monomer solution.

It has been found convenient to employ toluene, benzene, xylene, or other inert organic azeotrope-forming organic liquids in performing this. Toluene is the preferred azeotrope-forming organic liquid. Heating the alkali carbonate or hydroxide, phenol compound and small amounts of the azeotrope former to reflux for several hours while removing the azeotrope is the most desirable. However, it is obvious that any other technique for removing essentially all of the water can be equally satisfactory. It is not essential and critical in this reaction that all of the azeotropic former be removed before the reaction of the alkali metal salt of the phenol compound with the dihalobenzenoid compound (monomer reaction) or the reaction of the aryl polyhalide monomers to form substantially linear high molecular weight thermoplastic polymers (polymerization reaction).

The azeotrope former can be one either miscible or immiscible with the major aprotic solvent of the integrated process. If it is not miscible it should be one which will not cause precipitation of the aryl polyhalide monomer or the high molecular weight polymer in the reaction mass. Heptane is such a solvent. When employed, it will merely remain inert and immiscible in the reaction mass. if the azeotrope former would cause precipitation of the polymer, it should be removed almost completely from the reaction mass before initiating polymerization.

For such reasons, it is preferred to employ azeotrope formers which are miscible with the major solvents and which also act as cosolvents for polymer during polymerization. Toluene and xylene are azeotrope formers of this class. Preferably the azeotrope former should be one boiling below the decomposition temperature of the major solvent and be perfectly stable and inert in the process, particularly inert to the alkali metal carbonate or hydroxide when the alkali metal salt of the phenol compound is prepared in situ in the presence of the inert diluent or azeotrope former.

The phenol compound employed in the integrated process of this invention is not narrowly critical. It can be, for instance, a mononuclear monohydric phenol compound having at least one halogen group preferably in a position para or meta to the hydroxyl group such as p-chlorophenol and m-chlorophenol. The phenol compound can also be a mononuclear dihydric phenol such as, for example, hydroquinone. The phenol compound can further be a polynuclear monohydric phenol such as:

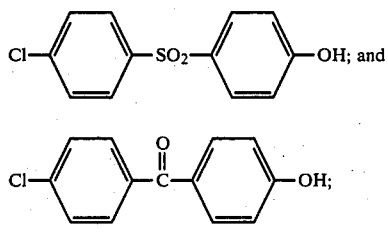

or a polynuclear dihydric phenol such as: the bis-(hydroxylphenyl)alkanes such as 2,2-bis-(4-hydroxyphenyl)propane (bisphenol A); di(hydroxyphenyl)sulfones such as bis-(4-hydroxyphenyl)sulfone (bisphenol S); and di(hydroxyphenyl)ethers such as bis-(4-hydroxyphenyl)ether. The preferred phenol compounds include 2,2-bis-(4-hydroxyphenyl)propane, bis-(4-hydroxyphenyl)sulfone, bis-(4-hydroxyphenyl)ether, hydroquinone and p-chlorophenol. It is possible tha the phenol compounds be substituted with other inert nuclear substituents such as alkyl, alkoxy and the like inert substituents. Polynuclear dihydric phenol compounds useful in the integrated process of this invention are further described in U.S. Pat. No. 4,175,175 and U.S. Pat. No. 4,108,837.

Any of the alkali metal carbonates or hydroxides, e.g., potassium carbonate or potassium hydroxide, can be employed in the integrated process of this invention, that is to say any alkali metal salt of the phenol compound can be used as the reactant in the monomer reaction. Potassium and cesium salts have been found to react consideralby faster than the sodium salts, but due to expense of the cesium salts, the potassium salts are preferred. The alkali metal salt of the phenol compound can be single metal salt such as preferrably the potassium salt of p-chlorophenol or a double metal salt such as the dipotassium salt of 2,2-bis-(4-hydroxyphenyl)propane or the dipotassium salt of hydroquinone. As heretofore indicated, the alkali metal carbonate or hydroxide and the phenol compound are admixed in about stoichiometric amounts sufficient to form the alkali metal salt of the phenol compound. The integrated process of the instant invention is not limited to phenate salts as nucleophiles. Other nucleophiles such as hydroxides, alkoxides, and sulfyl and nitrogen nucleophiles may also be employed in this process.

Any dihalobenzenoid compound or mixture of dihalobenzenoid compounds can be employed in this invention which compound or compounds has the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is an activating electron withdrawing group in the ortho or para position of the benzenoid nucleus.

Any of the halogens may be the reactive halogen substituents on the benzenoid compounds. Fluorine and chlorine substituted benzenoid reactants are preferred; the fluorine compounds for fast reactivity an the chlorine compounds for their inexpensiveness. However, the aryl polyhalide monomer produced should not contain terminal aryl fluoride groups since these groups are not coupled efficiently by the nickel catalyst, thus preventing the formation of high molecular weight polymers.

A wide variety of electron withdrawing groups can be employed as the activator group in these compounds. It should be, of course, inert to the reaction, but otherwise its structure is not critical. Preferred are the strong activating groups such as the sulfone group

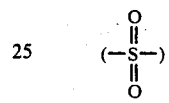

bonding two halogen substituted benzenoid nuclei as in the 4,4'-dichlorodiphenyl sulfone and 4,4'-difluorodiphenyl sulfone, although such other strong withdrawing groups hereinafter mentioned can also be used with equal ease.

The preferred activating groups can be basically either of two types:

(a) monovalent groups that activate one or more halogens on the same ring as a phenylsulfone, or alkylsulfone, cyano, trifluoromethyl, and hetero nitrogen as in pyridine.

(b) divalent group which can activate displacement of halogens on two different rings, such as the carbonyl group

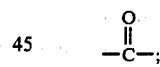

the vinylene group

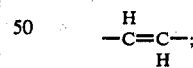

the sulfoxide group

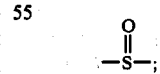

the azo-group —N=N—; the saturated fluorocarbon groups —CF$_2$CF$_2$—; organic phosphine oxides

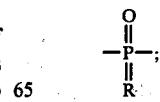

where R is a hydrocarbon group, and the ethylidene group

where X can be hydrogen or halogen or which can activate halogens on the same ring such as the difluorobenzoquinone, 1,4-or 1,5- or 1,8-difluoroanthraquinone. The dihalbenzenoid compounds useful in the integrated process of this invention are further described in U.S. Pat. No. 4,175,175 and U.S. Pat. No. 4,108,837, however, nitro and nitroso groups cannot be used in the process of this invention.

The preferred dihalobenzenoid compounds include, for example, 4,4'-dichlorophenylsulfone, 4,4'-difluorophenylsulfone, 4,4'-difluorobenzophenone, 4,4'-dichlorobenzophenone, 1,4-bis(p-chloro-N-methyl-benzenesulfonamido)butane, 4,4'-dichloroazobenzene and piperazine bis-p-chlorobenzenesulfonamide.

The reaction of the dihalobenzenoid compound with the alkali metal salt of the phenol compound (monomer reaction) readily proceeds without need of an added catalyst upon the application of heat to such a mixture in the selected aprotic solvent. Inasmuch as the monomer reaction is conducted in the liquid phase of the solvent, the selected reaction temperature should be below the ambient boiling point of solvent and above its freezing point.

Also desirable is the exclusion of oxygen from the reaction mass to avoid any possibility of oxidative attack to the monomer or to the principal solvent during the monomer reaction particularly at the higher temperatures. Nitrogen blanketing the reaction flask serves this purpose very well.

While the monomer reaction temperature is not narrowly critical, it has been found that at temperatures below about room temperature, the reaction time is inordinately long in order to secure the desired aryl polyhalide monomers. The higher temperatuers, i.e., above room temperature and generally about 100° C., are much more preferred for shorter processing times and for a more economical system. Most preferred are temperatures between about 120° C. to 160° C. Higher temperatures can of course be employed, if desired, provided that care is taken to prevent degradation or decomposition of the reactants, the monomer and the solvents employed. The reaction time can vary from minutes to as long as several hours.

The monomer reaction temperature can be effectively increased even above the normal boiling point of the solvent or mixture of solvents by the use of pressure in the system. However, for most practical reactions contemplated herein, atmospheric pressures are quite adequate, though if desired pressures as high as 1000 psig or more can be employed.

The monomer reaction between the alkali metal salt of the phenol compound and the dihalobenzenoid compound proceeds on a variable stoichiometric basis such that the desired aryl polyhalide monomer is formed. Stoichiometry is not critical and the only requirement is that the stoichiometric amounts employed insure that the resulting aryl polyhalide monomers are halogen terminated, preferably chlorine terminated. By varying the stoichiometry, one can vary the aryl polyhalide monomer ultimately produced and its properties.

The aryl polyhalide monomers may have various structural combinations including among others the following:

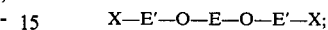

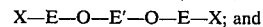

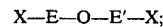

wherein X is halogen, E is the residuum of the phenol compound and E' is the residuum of the dihalobenzenoid compound. As used herein, the term E defined as being the "residuum of the phenol compound" of course refers to the residue of the phenol compound after the removal of the aromatic hydroxyl group or groups. It is seen also that as used herein, the E' term defined as being the "residuum of the dihalobenzenoid compound" refers to the aromatic or benzenoid residue of the compound after removal of one or both halogen atoms from the benzenoid nucleus. Preferred aryl polyhalide monomers include among others the following:

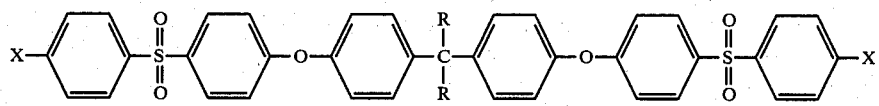

where X is halogen and R represents a member of the group consisting of hydrogen, lower alkyl, lower aryl and the halogen-substituted groups thereof;

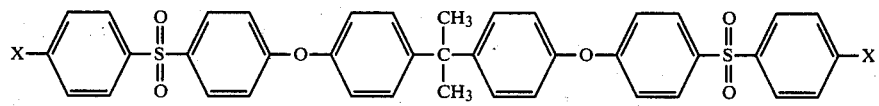

wherein X is halogen, preferably chlorine;

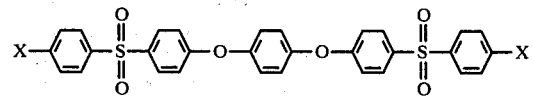

wherein X is halogen, preferably chlorine;

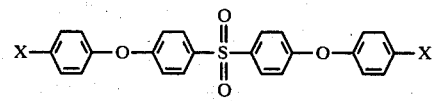

wherein X is halogen, preferably chlorine; and

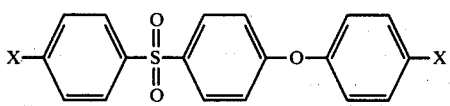

wherein X is halogen, preferably chlorine. The sulfone group present in the above preferred aryl polyhalide monomers may be replaced with another activating group described hereinabove in regard to useful dihalobenzenoid compounds. The aryl polyhalide monomer produced in (ii) described above may comprise a mixture of at least two aryl polyhalide monomers selected from the above described monomers.

The polymerization reaction or coupling of the aryl polyhalide monomers proceeds by directly contacting the monomers with a catalyst mixture in the presence of a reducing metal selected from the group consisting of zinc, magnesium and manganese or mixtures thereof. The polymerization reaction is conducted in the presence of a liquid phase of an aprotic solvent under substantially anhydrous conditions for a time and at a temperature sufficient to form the substantially linear high molecular weight thermoplastic polymers.

The catalyst mixture comprises an anhydrous nickel compound and at least one ligand selected from the group consisting of a triarylphosphine having from about 6 to about 14 carbon atoms in each aryl moiety and an aromatic bidentate compound containiing at least one ring nitrogen atom and from about 5 to about 30 carbon atoms. Suitable nickel compound are nickel (o) complexes and those reducible by organometallic and metal reducing agents. These compounds include nickel halides, that is, the chlorides, bromides and iodides, nickel sulfates, nickel phosphates, nickel carbonates, nickel salts of organic acids having 1 to 18 carbons, such as, nickel formate, nickel acetate, and nickel organic complexes such as nickel acetylacetonate, dichloro- bis(triphenylphosphine)nickel (II) and the like; and nickel (O) compounds such as bis(1,5-cyclooctadiene)nickel, tetrakis(triphenylphosphine)-nickel, and the like. The anion of the nickel compounds is unimportant and merely serves to provide nickel ion to the catalyst mixture, but it must not interfere with the reaction of the nickel compound with the ligand. The preferred anions are the halides. Suitable triarylphosphines include triphenylphosphine, triphenylphosphines containing alkyl or alkoxy substituents having up to about 8 carbon atoms, and unsubstituted or alkyl- and alkoxy-substituted trinaphthyl phosphines. Suitable bidentate compounds include 2,2'-bipyridine, 1,10-phenanthroline, 1,8-naphthylpyridine, 2-methylaminopyridine, and the like. The preferred catalyst mixture comprises nickel chloride, triphenylphosphine and 2,2'-bipyridine.

The preferred ratio of gram atoms of nickel per mole of aryl polyhalide monomer is about 0.001 to about 0.1, with the most preferred range being 0.005 to 0.02. The ratio of triarylphosphine to nickel can range from 0 to about 100, preferably from about 10 to about 50 moles per gram atom of nickel. The ratio of bidentate ligand to nickel can range from 0 to about 5, preferably from about 0.2 to about 2, moles of bidentate ligand to gram atom of nickel. It is preferred to use a combination of triarylphosphine and aromatic bidentate ligand, wherein the ratio of triarylphosphine to nickel varies from about 10 to about 50, and the ratio of bidentate ligand to nickel varies from about 0.5 to about 2 moles per gram atom of nickel.

The preferred reducing metal for use in the polymerization reaction of aryl polyhalide monomers is zinc metal although magnesium and manganese metals can also be used. It is preferred that the metal be in finely divided form with an average sieve size of 20 or finer when measured on the U.S. sieve scale. Although the stoichiometric amount of reducing metal required in this polymerization or coupling reaction is about 1 mole of reducing metal per mole of aryl polyhalide monomer i.e., dihalide, it is preferred to use a 50 percent excess or greater.

While not wishing to be bound by any scientific theory or explanation of the mechanism of the polymerization or coupling reaction of this invention, it is believed, that the combination of nickel compound, ligand and reducing metal provides nickel in a zero valent state, a form which in an anhydrous aprotic medium enables the coupling of aryl polyhalide monomers to take place in excellent yields. The nickel (o) ligand complex believed to be the active catalyst can be formed in situ in the presence of an aryl polyhalide monomer solution, but the catalyst is preferably preformed in situ prior to the addition of the aryl polyhalide monomer solution. A method for the determination of zero valent nickel is described by C. A. Tolman, J. Am. Chem. Soc. 92, 2956 (1970). The presence of the active catalyst in the integrated process of this invention is indicated by the characteristic brown to red-brown color.

The polymerization or coupling reaction can take place at temperatures of from about 0° C. to about 250° C., preferably from about 25° C. to about 120° C., and most preferably from about 40° C. to about 100° C. Pressure is not critical and so superatmospheric or subatmospheric pressures can be used as well as atmospheric pressure. The reaction is preferably carried out in an inert atmosphere. Reaction time can vary from minutes to as long as several hours. Inorganic salt promoters may be used with the triarylphosphines as ligands to reduce reaction times and/or temperatures.

Preferred inorganic salt promoters include alkali, alkaline earth, zinc, magnesium, manganese, and aluminum halides, or mixtures thereof. Iodides, chlorides and bromides are particularly preferred. The amount of promoter when used can range from about 0.1 to about 1000 moles per gram atom of nickel with about 1 to about 100 moles of promoter being preferred. If desired one can also employ alkali, alkaline earth, zinc, magnesium, manganese, and aluminum sulfates or phosphates or mixtures thereof as promoters.

The substantially linear thermoplastic polymers are characterized by high molecular weights. The polymers are composed of recurring units of the residuum of the aryl polyhalide monomers, i.e., the aryl polyhalide monomer residue after the removal of the terminal halogen atoms on the aromatic nucleii. The substantially linear high molecular weight thermoplastic polymers may have recurring units of various structural combinations including among others the following:

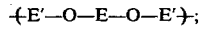

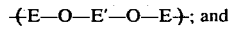

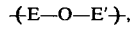

where E is the residuum of the phenol compound and E' is the residuum of the dihalobenzenoid compound described hereinabove and wherein the E residuum and the E' residuum may be valently bonded to ether oxygens through aromatic carbon atoms or valently bonded to each of an aromatic carbon atom and an ether oxygen through an aromatic carbon atom. It is noted that the recurring units are valently bonded through aromatic carbon atoms during the polymerization reaction. Preferred substantially linear high molecular weight thermoplastic polymers include among others the following:

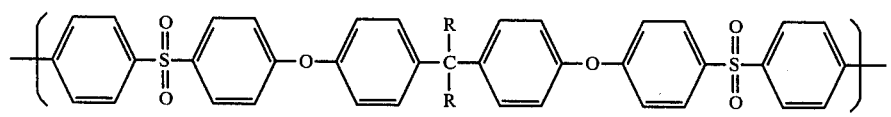

wherein R represents a member of the group consisting of hydrogen, lower alkyl, lower aryl and the halogen substituted groups thereof;

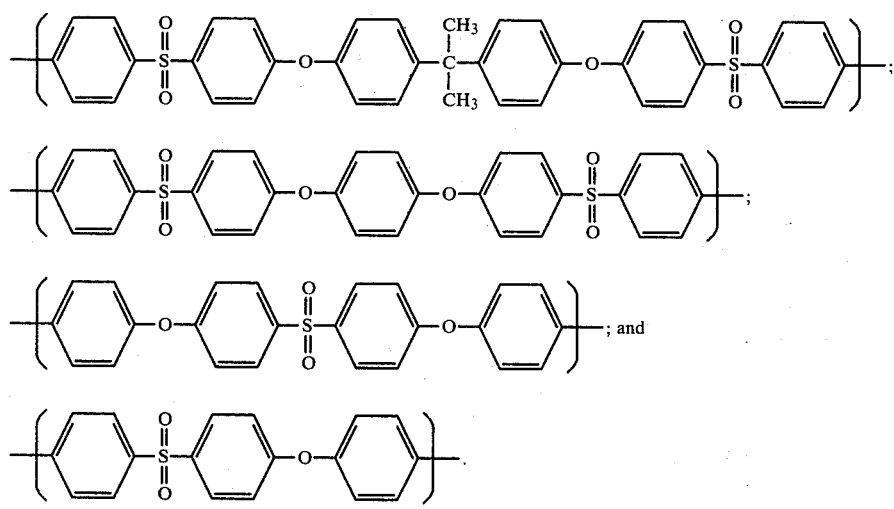

The sulfone group present in the above preferred substantially linear high molecular weight thermoplastic polymers may be replaced with another activating group described hereinabove in regard to useful dihalobenzenoid compounds. The substantially linear high molecular weight thermoplastic polymers can include such compounds as polycarbonates, polysulfones, polyethersulfones, polyesters, polyarylates, polyurethanes, polyetherimides, polyimides and the like.

As indicated hereinabove, the substantially linear thermoplastic polymers are characterized by high molecular weights. The molecular weight of these polymers is indicated by reduced viscosity in indicated solvents. As well understood in the art, the viscosity of a resin solution bears a direct relationship to the weight average molecular size of the polymer chains, and is the most important single property that can be used to characterize the degree of polymerization. The reduced viscosity assigned to the polymer masses of the present invention is therefore to be understood as significant in reflecting molecular size rather than consideration concerning the viscosity per se. Most of these polymers have indicated ready solubility in N-methylpyrrolidinone, chloroform, or tetrachloroethane or other similar solvent. In all instances, the reduced viscosity above about 0.35 is an indication of a tough, strong fiber- or film-forming polymer with those having a reduced viscosity about 0.4 being most preferred.

Reduced viscosity (R.V.) as used herein was determined by dissolving a 0.2 gram sample of thermoplastic polymer in the indicated solvent, i.e., N-methylpyrrolidinone, contained in a 100 ml. volumetric flask so that the resultant solution measured exactly 100 ml at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{c \cdot t_o}$$

wherein:
$t_o$ is the efflux time of the pure solvent
$t_s$ is the efflux time of the polymer solution
C is the concentration of the polymer solution expressed in terms of grams of polymer per 100 ml. of solution.

Although this invention has been described with respect to a number of details, it is not intended that this invention should be limited thereby. The examples which follow are intended solely to illustrate the embodiments of this invention which to date have been determined and are not intended in any way to limit the scope and intent of this invention.

EXAMPLES 1 THROUGH 16

Part A: Preparation of Aryl Polyhalide Monomer

Into a 3-necked 100 milliliter round bottom flask equipped with a thermometer, a mechanical stirrer and a Claisen adaptor to which was attached a nitrogen purge line and a Dean-Stark trap with a condenser was added 4,4'-dichlorodiphenylsulfone, potassium carbonate and p-chlorophenol in amounts given for each example in Table I below in addition to 55 milliliters of N,N-dimethylacetamide and 35 milliliters of toluene for each example. Specified phenol compounds in Table I were substituted for p-chlorophenol in Examples 13 through 16. The resulting mixtures were purged with nitrogen for 30 minutes and then heated by an electric mantle with reflux beginning at about 112° C. to 115° C. Toluene and water were removed azeotropically from the mixture and thereafter condensed and collected in the Dean-Stark trap. As toluene was removed azeotropically from the mixture, the temperature of the mixture increased to 160° C. and was maintained at 160° C. for the specified monomer reaction time given for each example in Table I. Certain examples identified in Table I employed an additional post azeotrope step after the specified monomer reaction time in which the mixture was cooled to 130° C., 25 milliliters of toluene were added to the reaction flask in Examples 1 through 12 and 15 milliliters of toluene were added to the reaction flask in Examples 13 through 16, and the reaction temperature again increased to azeotropically remove toluene and water from the mixture. The resulting aryl polyhalide monomer solution was subsequently employed in the polymerization reaction of Part B.

Part B: Preparation of Substantially Linear Thermoplastic Polymer

Into a 3-necked 250 milliliter round bottom flask equipped with a magnetic stirrer and a 250 milliliter Airless-ware filter funnel having an upper and lower stopcock was added a catalyst mixture containing nickel chloride, triphenylphosphine and 2,2'-bipyridine in amounts specified for each example in Table I. Zinc was also added in amounts specified for each example in Table I. The flask was sealed by placing a serum cap on one of the remaining flask necks and an adaptor with a stopcock on the other remaining flask neck. The stopcock was attached to a double manifold line by pressure tubing. With the lower stopcock on the filter funnel closed, the flask was alternatively filled with nitrogen and purged several times. 25 milliliters of dry N,N-dimethylacetamide were then added by syringe to the catalyst mixture and the flask was placed in an oil bath of 70° C. with continuous stirring. The resulting catalyst solution for each example became red-brown within 30 minutes.

All of the equipment on the flask used in the preparation of the aryl polyhalide monomer solution in Part A was removed, two necks of the flask were then sealed with serum caps and the remaining flask neck was attached to the Airless-ware filter funnel having an upper and lower stopcock described above. The upper stopcock was attached to the double manifold line and the flask containing the aryl polyhalide monomer solution was alternatively filled with nitrogen and purged several times. The lower stopcock was then opened and the aryl polyhalide monomer solution was filtered into the flask containing the catalyst solution. The resulting polymerization reaction was run at 70° C. for the specified polymer reaction time given for each example in Table I. At the end of the specified polymer reaction time, 0.5 milliliters of chlorobenzene were added to the polymer solution and reacted for 30 minutes to remove any nickel attached to the substantially linear thermoplastic polymer. The reaction flask was then exposed to the atmosphere and the polymer solution for each example was diluted with 80 milliliters of N,N-dimethylacetamide. The diluted polymer solutions were filtered through a medium glass filter funnel, coagulated in 1 liter of methanol in a blender and the substantially linear high molecular weight thermoplastic polymers were collected by filtration. The polymers for each example were then slurried at 90° C. in 1 liter of deionized water for 1 hour, filtered, washed with several cake volumes of methanol and dried in a vacuum oven. The reduced viscosity for each substantially linear thermoplastic polymer, measured in N-methylpyrrolidinone at 25° C. by dissolving approximately 0.2 grams of the polymer in 100 milliliters of N-methylpyrrolidinone, is given in Table I.

TABLE I

PRODUCTION OF SUBSTANTIALLY LINEAR THERMOPLASTIC POLYMERS FROM ARYL POLYHALIDE MONOMERS

| EXAMPLE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Preparation of Aryl Polyhalide Monomer | | | | | | | | | | | | | | | | |
| Ingredients: | | | | | | | | | | | | | | | | |
| 4,4'-Dichlorophenylsulfone, grams | 18.0 | 18.0 | 18.0 | 18.0 | 18.0 | 18.0 | 18.0 | 18.0 | 18.0 | 18.0 | 18.0 | 18.0 | 18.0 | 18.0 | 18.0 | 18.0 |
| Potassium Carbonate, grams | 18.2 | 18.2 | 18.2 | 18.2 | 18.2 | 18.2 | 18.2 | 18.2 | 18.2 | 18.2 | 18.2 | 11.3 | 18.2 | 18.2 | 18.2 | 18.2 |
| p-Chlorophenol, grams | 16.1 | 15.9 | 8.1 | 8.1 | 16.1 | 8.1 | 16.1 | 8.1 | 16.1 | 16.1 | 8.1 | 8.1 | 0 | 0 | 0 | 0 |
| Hydroquinone, grams | 0 | 0 | 0 | 0 | 0 | 0 | 0 | 0 | 0 | 0 | 0 | 0 | 3.45 | 3.45 | 0 | 0 |
| Bisphenol A, grams | 0 | 0 | 0 | 0 | 0 | 0 | 0 | 0 | 0 | 0 | 0 | 0 | 0 | 0 | 7.15 | 7.0 |
| Aryl Polyhalide Monomer Reaction Time, hours | 4 | 3 | 2 | 2 | 4 | 2 | 4 | 4 | 4 | 4 | 4 | 4 | 2 | 4 | 4 | 4 |
| Post Azeotrope Step | No | Yes | No | No | No | Yes | Yes | Yes | Yes | Yes | Yes | Yes | Yes | Yes | Yes | Yes |
| Preparation of Substantially Linear Thermoplastic Polymer | | | | | | | | | | | | | | | | |
| Catalyst Ingredients: | | | | | | | | | | | | | | | | |
| Nickel Chloride, grams | 0.15 | 0.16 | 0.08 | 0.16 | 0.16 | 0.08 | 0.08 | 0.16 | 0.08 | 0.08 | 0.08 | 0.08 | 0.08 | 0.08 | 0.08 | 0.08 |
| Triphenylphosphine, grams | 9.0 | 9.0 | 9.0 | 9.0 | 9.0 | 9.0 | 9.0 | 9.0 | 9.0 | 6.0 | 9.0 | 9.0 | 9.0 | 9.0 | 9.0 | 9.0 |
| 2,2'-bipyridine, grams | 0.22 | 0.20 | 0.10 | 0.20 | 0.20 | 0.10 | 0.10 | 0.20 | 0.10 | 0.10 | 0.10 | 0.10 | 0.10 | 0.10 | 0.10 | 0.10 |
| Zinc, grams | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 |
| Substantially Linear Thermoplastic Polymer Reaction Time, hours | 16.0 | 16.0 | 10.0 | 16.0 | 10.0 | 10.0 | 16.0 | 10.0 | 16.0 | 16.0 | 16.0 | 16.0 | 16.0 | 16.0 | 16.0 | 16.0 |
| Reduced Viscosity | 0.36 | 0.53 | 0.36 | 0.56 | 0.18 | 0.78 | 0.83 | 0.46 | 0.69 | 0.42 | 0.89 | 1.17 | 0.32 | 0.38 | 0.43 | 0.32 |

Examples 1 through 16 illustrate the preparation of substantially linear high molecular weight thermoplastic polymers derived from aryl polyhalide monomers. Substantially higher reduced viscosities of the polymers are obtained by employing the post azeotrope step in the preparation of the aryl polyhalide monomer (compare Example 5 employing no past azeotrope step and having a reduced viscosity of 0.18 with Example 6 employing a post azeotrope step and having a reduced viscosity of 0.78). When the catalyst mixture contains nickel chloride in an amount of 0.08 grams, triphenylphosphine should be present in the catalyst mixture in an amount of 9.0 grams. Reducing the amount of triphenylphosphine to 6.0 grams adversely lowers the reduced viscosities of the substantially linear thermoplastic polymers (compare Examples 9 and 10). A large excess of potassium carbonate is not necessary for the preparation of substantially linear thermoplastic polymers having desirable reduced viscosities (compare Examples 11 and 12).

I claim:

1. An integrated process for preparing a substantially linear thermoplastic polymer derived from an aryl polyhalide monomer which comprises:
   (i) contacting a phenol compound with about stoichiometric amounts of an alkali metal carbonate or hydroxide sufficient to form an alkali metal salt of the phenol compound in a liquid phase of an aprotic solvent and an azeotrope former and for a time and at a temperature sufficient to form the alkali metal salt of the phenol compound;
   (ii) contacting the alkali metal salt of the phenol compound with a dihalobenzenoid compound sufficient to form an aryl polyhalide monomer in a liquid phase of an aprotic solvent and an azeotrope former for a time and at a temperature sufficient to form the aryl polyhalide monomer, wherein the dihalobenzenoid compound has an inert electron withdrawing group in one or more of the positions ortho and para to the halogen atoms thereby activating the halogen atoms to a level sufficient to react with said alkali metal salt of the phenol compound;
   (iii) removing water from the reaction mass of (i) and (ii) as an azeotrope with said azeotrope former until substantially anhydrous conditions are attained and excess azeotrope former is substantially removed; and
   (iv) coupling aryl polyhalide monomers by contacting said monomers with a catalyst mixture in the presence of a reducing metal selected from the group consisting of zinc, magnesium and manganese or mixtures thereof and in a liquid phase of an aprotic solvent under substantially anhydrous conditions for a time and at a temperature sufficient to form a substantially linear thermoplastic polymer, wherein the catalyst mixture comprises an anhydrous nickel compound and at least one ligand selected from the group consisting of a triarylphosphine having from about 6 to about 14 carbon atoms in each aryl moiety and an aromatic bidentate compound containing at least one ring nitrogen atom and from about 5 to about 30 carbon atoms and wherein the ratio of gram atoms of nickel per mole of aryl polyhalide monomer is from about 0.001 to about 0.1, the amount of ligand is from about 1 to about 50 moles per gram atom of nickel and the amount of reducing metal is at least about 1 mole of reducing metal per mole of aryl polyhalide monomer.

2. An integrated process as defined in claim 1 wherein the phenol compound is selected from the group consisting of bisphenol A, hydroquinone, bisphenol S and p-chlorophenol and the alkali metal carbonate or hydroxide is potassium carbonate or potassium hydroxide.

3. An integrated process as defined in claim 2 wherein the alkali metal salt of the phenol compound is the dipotassium salt of bisphenol A.

4. An integrated process as defined in claim 2 wherein the alkali metal salt of the phenol compound is the dipotassium salt of hydroquinone.

5. An integrated process as defined in claim 2 wherein the alkali metal salt of the phenol compound is the potassium salt of p-chlorophenol.

6. An integrated process as defined in claim 2 wherein the aprotic solvent is selected from the group consisting of N,N-dimethylacetamide, N,N-dimethylformamide, dimethlsulfoxide and sulfolane and the azeotrope former is selected from the group consisting of toluene, benzene, heptane and xylene.

7. An integrated process as defined in claim 6 wherein the dihalobenzenoid compound is selected from the group consisting of
   4,4'-dichlorophenylsulfone,
   4,4'-difluorophenylsulfone,
   4,4'-difluorobenzophenone,
   4,4'-dichlorobenzophenone, 1,4-bis-(p-chloro-N-methyl-benzenesulfonamido)butane,
   4,4'-dichloroazobenzene and piperazine bis-p-chlorobenzenesulfonamide.

8. An integrated process as defined in claim 7 wherein the reaction of (ii) is conducted at a temperature above 100° C. and below the decomposition temperature of the reactants, the solvent and the aryl polyhalide monomer.

9. An integrated process as defined in claim 8 wherein the aryl polyhalide monomer is selected from the group consisting of:

X—E'—O—E—O—E'—X;

X—E—O—E'—O—E—X; and

X—E—O—E'—X, wherein X is halogen, E is the residuum of the phenol compound and E' is the residuum of the dihalobenzenoid compound.

10. An integrated process as defined in claim 9 wherein the aryl polyhalide monomer has the formula:

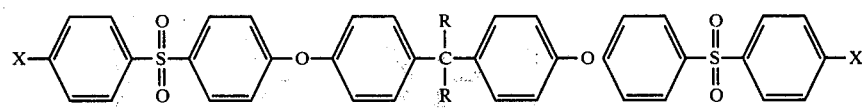

wherein R represents a member of the group consisting of hydrogen, lower alkyl, lower aryl and the halogen substituted groups thereof.

11. An integrated process as defined in claim 9 wherein the aryl polyhalide monomer has the formula:

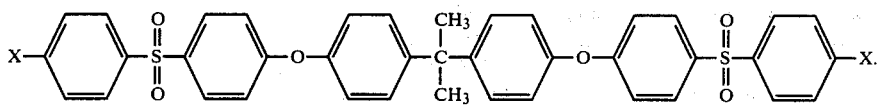

12. An integrated process as defined in claim 9 wherein the aryl polyhalide monomer has the formula:

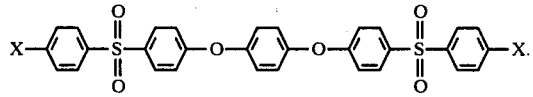

13. An integrated process as defined in claim 9 wherein the aryl polyhalide monomer has the formula:

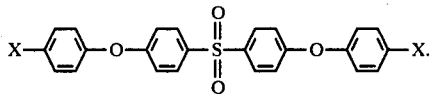

14. An integrated process as defined in claim 9 wherein the aryl polyhalide monomer has the formula:

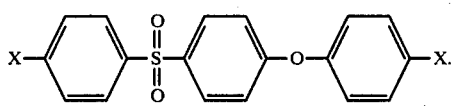

15. An integrated process as defined in claim 9 wherein the aryl polyhalide monomer is a mixture comprising at least two aryl polyhalide monomers selected from the group consisting of:

X—E'—O—E—O—E'—X;

X—E—O—E'—O—E—X; and

X—E—O—E'—X.

16. An integrated process as defined in claim 15 wherein the water content of the reaction mixture of (i) and (ii) is maintained less than about 0.5 percent by weight and is reduced to about 0.01 weight percent before the polymerization reaction of (iv).

17. An integrated process as defined in claim 16 wherein the catalyst mixture comprises an anhydrous nickel compound selected from the group consisting of nickel chlorides, bromides and iodides, a triarylphosphine selected from the group consisting of triphenylphosphine and trinaphthylphosphine, and an aromatic bidentate compound selected from the group consisting of 2,2'-bipyridine, 1,10-phenanthroline, 1,8-naphthylpyridine and 2-methylaminopyridine.

18. An integrated process as defined in claim 16 wherein the catalyst mixture comprises nickel chloride, triphenylphosphine and 2,2'-bipyridine.

19. An integrated process as defined in claim 17 wherein the reducing metal is a finely divided powder having a mesh size of 20 or finer when measured in the U.S. sieve scale.

20. An integrated process as defined in claim 17 wherein the reducing metal is zinc.

21. An integrated process as defined in claim 19 wherein an inorganic salt selected from the group consisting of alkali, alkaline earth, zinc, magnesium, manganese and aluminum halides or mixtures thereof is added as a promoter in an amount of from about 0.1 to about 1000 moles per gram atom of nickel.

22. An integrated process as defined in claim 21 wherein the inorganic salt is selected from the group consisting of an alkali metal chloride, an alkali metal iodide and an alkali metal bromide.

23. An integrated process as defined in claim 21 wherein the water content of the reaction mixture of (iv) is maintained at about 0.01 percent by weight.

24. An integrated process as defined in claim 23 wherein the coupling reaction of (iv) is conducted at a temperature of from about 0° C. to about 250° C.

25. An integrated process as defined in claim 24 wherein the substantially linear thermoplastic polymer is selected from the group consisting of recurring units of:

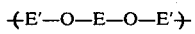

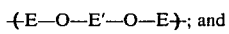; and

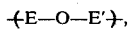, where E is the residuum of the phenol compound and E' is the residuum of the dihalobenzenoid compound and wherein the E residuum and the E' residuum may be valently bonded to ether oxygens through aromatic carbon atoms or valently bonded to each of an aromatic carbon atom and an ether oxygen through an aromatic carbon atom.

26. An integrated process as defined in claim 25 wherein the substantially linear thermoplastic polymer has recurring units of the formula:

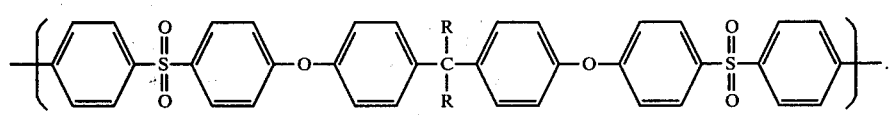

wherein R represents a member of the group consisting of hydrogen, lower alkyl, lower aryl and the halogen substituted groups thereof.

27. An integrated process as defined in claim 25 wherein the substantially linear thermoplastic polymer has recurring units of the formula:

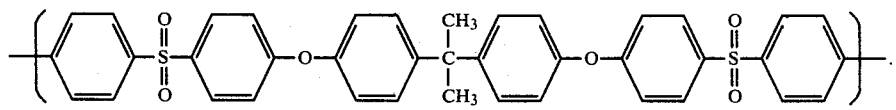

28. An integrated process as defined in claim 25 wherein the substantially linear thermoplastic polymer has recurring units of the formula:

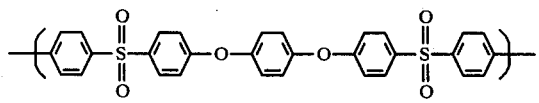

29. An integrated process as defined in claim 25 wherein the substantially linear thermoplastic polymer has recurring units of the formula:

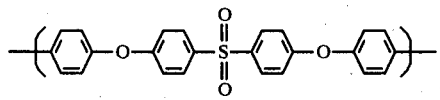

30. An integrated process as defined in claim 25 wherein the substantially linear thermoplastic polymer has recurring units of the formula:

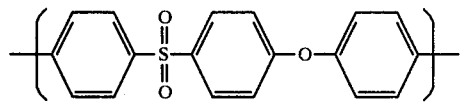

31. An integrated process as defined in claim 1 wherein the substantially linear thermoplastic polymer is selected from the group consisting of a polyester, a polycarbonate, a polysulfone, a polyether, a polyimide and a polyketone.

32. An integrated process as defined in claim 25 wherein the aprotic solvent is N,N-dimethylacetamide.

33. An integrated process as defined in claim 25 wherein the catalyst mixture is added directly to the reaction mass of (ii) such that the catalyst is formed in situ in the aryl polyhalide monomer solution.

34. An integrated process as defined in claim 25 wherein the phenol compound and the alkali metal carbonate or hydroxide are added directly to the reaction mass of (ii) such that the alkali metal salt of the phenol compound is formed in situ in the aryl polyhalide monomer solution.

* * * * *